(12) United States Patent
Risbjerg Jarlkov et al.

(10) Patent No.: US 10,010,844 B2
(45) Date of Patent: Jul. 3, 2018

(54) REACTOR WITH PLATE FIXING SYSTEM

(71) Applicant: Haldor Topsøe A/S, Kgs. Lyngby (DK)

(72) Inventors: Klaus Risbjerg Jarlkov, New Delhi (IN); Ulf Lytzen, Espergærde (DK)

(73) Assignee: Haldor Topsoe A/S, Lyngby (DK)

( * ) Notice: Subject to any disclaimer, the term of this patent is extended or adjusted under 35 U.S.C. 154(b) by 195 days.

(21) Appl. No.: 15/035,583

(22) PCT Filed: Nov. 7, 2014

(86) PCT No.: PCT/EP2014/074002
§ 371 (c)(1),
(2) Date: May 10, 2016

(87) PCT Pub. No.: WO2015/071182
PCT Pub. Date: May 21, 2015

(65) Prior Publication Data
US 2016/0271578 A1    Sep. 22, 2016

(30) Foreign Application Priority Data
Nov. 13, 2013 (EP) ..................... 13192678

(51) Int. Cl.
B01J 8/04    (2006.01)
B01J 8/00    (2006.01)
B01J 8/02    (2006.01)

(52) U.S. Cl.
CPC ............ *B01J 8/0453* (2013.01); *B01J 8/008* (2013.01); *B01J 8/0214* (2013.01); *B01J 8/0415* (2013.01); *B01J 2208/00884* (2013.01)

(58) Field of Classification Search
CPC ............ B01J 8/008; B01J 8/00; B01J 8/0453
USPC ......................................... 422/607
See application file for complete search history.

(56) References Cited

U.S. PATENT DOCUMENTS

| | | | |
|---|---|---|---|
| 2,595,384 A | 5/1952 | Johnsen et al. | |
| 5,916,529 A | 6/1999 | Scheuerman | |
| 6,409,378 B1 * | 6/2002 | Kessler | B01J 19/32 261/112.2 |
| 9,266,083 B2 * | 2/2016 | Kowalczyk | B01J 8/26 |
| 2016/0271578 A1 * | 9/2016 | Risbjerg Jarlkov | B01J 8/008 |

FOREIGN PATENT DOCUMENTS

DE    10 86 215 B    8/1960

* cited by examiner

*Primary Examiner* — Huy Tram Nguyen
(74) *Attorney, Agent, or Firm* — Blank Rome LLP

(57) ABSTRACT

A reactor comprising plate elements (04) with inter-locking sliding locks (05) for quick and easy mounting and de-mounting.

10 Claims, 3 Drawing Sheets

REACTOR WITH PLATE FIXING SYSTEM

FIELD OF THE INVENTION

This invention relates to a chemical reactor with an internal plate fixing system. Specifically the reactor is a multiple bed catalytic reactor which includes internals comprising one or more trays, where elements of the trays have to be fixed to the reactor. The reactor can be a down-flow catalytic reactor which includes vertically superimposed packed beds of particulate catalytic material. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC). Alternatively, the reactor is a radial converter, where elements of the decks have to be fixed to the reactor. This reactor has a radial flow crossing a packed bed of catalytic material and it is typically used in the petroleum and chemical processing industries for carrying out catalytic reactions such catalytic reforming and ammonia synthesis.

BACKGROUND OF THE INVENTION

Hydroprocessing is any process for treating a feedstock with hydrogen. Hydroprocessing may include hydrocracking, which is a process for converting of heavy oil fractions to light oil fractions, HDS/HDN, HYD, HAD, HDM, and HDO. Hydroprocessing is taking place in a hydroprocessing catalytic reactor which is the key element of a hydroprocessing unit. Hydroprocessing catalytic reactors can have single or multiple catalyst beds. Which of the options will be chosen for a particular reactor depends on the amount of catalyst is required for conversion of the feed to the product with desired properties. Most of the hydroprocessing reactions are exothermic and heat is developed as feed is passing through the catalyst bed. In order not to expose the catalyst to higher temperatures than required, and consequently to accelerate deactivation of the catalyst, the required volume of catalyst is divided into a number of beds with cooling zones (quench sections) installed between the beds. In a radial converter, the deck of the reactor ensures that the gas flow is collected along the perimeter of the reactor prior admission to the catalyst containing section.

Due to the installation, un-installation and maintenance requirements, as well as cleaning of elements of the reactor, it is crucial to provide full access to any of the reactor elements. In order to minimise the complexity of work in the reactor, it is necessary to enable convenient and fast opening/closing of all man-ways of all of the elements of the section.

Therefore a need exists for a reactor with an improved plate fixing system which provides simple and fast assembling and dismantling with a minimum use of tools, but still providing a secure, tight and stable fixing of the plates to the reactor internals.

SUMMARY OF THE INVENTION

The present invention provides a fixing system for plate elements in a reactor which is both stable and secure, but also fast and simple to operate, with relative few fixing parts which have to be operated manually as compared to state of the art reactor plate fixing systems. This lowers the mounting and de-mounting time, but also minimizes the possibility of faulty installation, as only a few parts, or even no parts at all have to be fastened with tools. Further an aspect of the invention is that even the few fixing parts necessary may be operated by hand, omitting the need for tools.

The reactor according to claim 1 of the invention is for chemical reactions and comprises a plate fixing system. The plates to be fixed may be a single plate which has to be removable for instance for passage through the reactor internals i.e. a man way; or it may be a larger number of plates which have to be removable for instance for inspection, service and cleaning. The larger number of plates may be positioned in at least one group of plate elements. The group of plate elements may cover a part of or substantially the entire cross sectional area of the reactor. To position the plate or plate elements in the reactor, a base structure is comprised in the reactor. The base structure for the one or more plate elements is base elements such as for example beams, other reactor internals, a structure hanging from the ceiling of the reactor or the like. Also the base elements are positioned in at least one group to form a coherent support for the plate elements. To provide the secure, swift and simple mounting and de-mounting of the plate elements, at least one of the plate elements in a group is a sliding lock plate. A sliding lock plate means that the plate has at least one sliding lock. The sliding lock is adapted to work so that when the plate is mounted on the base elements, it can be slided into a locked or an interlocked position by means of a slide and a consecutive plate or by means of a slide and a fixing element. The sliding lock allows the plate to be mounted on the base elements, the mounting taking place in a first direction, thereafter the plate is slided relative to the base elements in a second direction and after this sliding movement, the plate is locked against movement in the first direction or opposite the first direction because of the sliding lock. The plate is not yet locked against movement in the second direction or opposite the second direction, but this is accomplished by means of a consecutive plate or a fixing element. A consecutive plate is adapted to be mounted adjacent to the preceding plate. If the consecutive plate is also a sliding lock plate, the sliding direction of the consecutive plate is different from the sliding direction of the preceding plate. Thereby the consecutive sliding lock plate can slide into a position which blocks the preceding plate against movement opposite the preceding plates second direction, hence, the plates interlock.

In a further embodiment of the invention, the plate elements of each group of plate elements are all located in one level in the reactor. The plates elements in a group thereby forms an entire assembled plate, providing a platform for a person for service or the like.

In many cases, the first direction described above is coaxial with the reactor. For instance, if the reactor is installed vertically, the first direction may be downwards. In this embodiment, the second direction is often perpendicular to the reactor axis, which then for instance can be a horizontal direction. In a particular embodiment of the invention, the sliding direction of any of the consecutive sliding lock plates is perpendicular to the sliding direction of its preceding sliding lock plate. In some cases, the plates have at least some 90° cornered shape (rectangular, substantially triangular or other), and therefore often the sliding direction of a consecutive lock plate is perpendicular to the sliding direction of the preceding plate which enables the plates to interlock as described above.

In a specific embodiment of the invention, all plate elements except one in a plate element group are sliding lock plates, and the last further plate element is a fixing plate. The sliding lock plates are adapted to be mounted in consecutive order in a way that when the last sliding lock plate element in the group has been mounted, all the sliding lock plates except the last are interlocked. Then the last plate element, the fixing plate is mounted it can be but may not be comprising a sliding lock, but it does have at least one fixing means. The fixing means can fix the fixing plate to the base elements, thereby securing not only the fixing plate, but also preventing the last consecutive sliding lock plate from sliding. Thereby the whole plate element group is fixed and secured to the base elements and thus to the reactor. The plate elements may be elements of a reactor tray and the base elements may comprise rails.

In a specific embodiment of the invention, the sliding lock may be of the keyhole and bolt type. In this way the plate element may be positioned on the base elements in the first direction by letting the bolt head pass through the large part of the keyhole, which then has to be big enough to let the bolt head pass. Then when the plate element is slid in the second direction, the bolt and keyhole move relative to each other so the bolt head is positioned near the smaller part of the keyhole, which is adapted to be smaller than the bolt head, large enough to comprise the neck part of the bolt. Thus the plate element cannot move opposite the first direction, as this will make the bolt head hit the sides of the smaller part of the keyhole, not letting the bolt head pass. Either the bolt part or the keyhole part is fixed to the base elements and thus either the keyhole part or the bolt part is fixed to the plate element as fits best in the application.

I an embodiment of the invention, mounting or de-mounting of the plate elements may be performed without any tools. This may be accomplished if the fixing means is a quick release. By quick release is understood a fixing means which can fix a plate element to the base elements or to other plate elements, or to both a plate elements and the base elements without using tools or at least only using simple tools and without using much time. The quick release elements may be specially designed for the application in question. The quick release may for instance be in the form of a knee joint element, an eccentric, a wedge element, a screw and nut element, a screw and wing nut element or any of the mentioned elements in combination with a keyhole and bolt element. The quick release elements may be equipped with lever to omit the necessity of tools.

In a further aspect of the invention, the reactor comprising the plate fixing system as described above is used for a hydroprocessing reaction.

FEATURES OF THE INVENTION

1. Reactor for chemical reactions comprising a plate fixing system comprising one or more loose plate elements and one or more base elements fixed to the reactor, said plate elements are positioned in at least one group of plate elements on at least one group of base elements, at least one plate in each group are sliding lock plates, each comprising at least one sliding lock enabling positioning of said sliding lock plate on said base elements in a first direction and thereafter sliding said sliding lock plate in a second direction relative to said base elements to a position where it is locked against movement against the first direction, the sliding lock plates are positioned in a consecutive order where a consecutive sliding lock plate is adapted to be positioned adjacent to a preceding sliding lock plate and with a sliding direction different from the sliding direction of the preceding sliding lock plate, whereby said consecutive sliding lock plate blocks the preceding sliding lock plate against sliding movement.

2. Reactor according to feature 1, wherein the plate elements of each group are located in one level, thereby forming an assembled plate.

3. Reactor according to any of the preceding features, wherein the first direction is coaxial with the reactor and the second direction is perpendicular to the reactor axis.

4. Reactor according to any of the preceding features, wherein the sliding direction of any of the consecutive sliding lock plates is perpendicular to the sliding direction of its preceding sliding lock plate.

5. Reactor according to any of the preceding features, wherein all plate elements in a plate element group except one are sliding lock plates, and one plate element is a fixing plate which has at least one fixing means, the fixing plate is adapted to be positioned adjacent to and in a consecutive order after the last of the consecutive order sliding lock plates, the fixing means is adapted to fixing the fixing plate to the base elements in a position where it blocks the sliding movement of said last of the consecutive order sliding lock plates.

6. Reactor according to any of the preceding features, wherein the plate elements are elements of a reactor tray.

7. Reactor according to any of the preceding features, wherein the base elements comprise rails.

8. Reactor according to any of the preceding features, wherein the sliding lock is of the keyhole and bolt type, with either the bolt part fixed to the base elements and the keyhole part fixed to the sliding lock plates, or the keyhole part fixed to the base elements and the bolt part fixed to the sliding lock plates, or a mix of both.

9. Reactor according to any of the preceding features, wherein the fixing means is a quick release element.

10. Reactor according to any of the preceding features, wherein the fixing means is a screw and nut element, a screw and wing nut element, a knee joint element or a wedge element or any of the mentioned elements in combination with a keyhole and bolt element.

11. Use of a reactor comprising a plate fixing system according to any of the preceding features for hydroprocessing.

12. Use of a reactor comprising a plate fixing system according to any of the preceding features for a radial converter.

BRIEF DESCRIPTION OF THE DRAWINGS

The invention is further illustrated by the accompanying drawings showing examples of embodiments of the invention.

POSITION NUMBERS

01. Plate elements.
02. Base elements.
03. Plate element group.

04. Sliding lock plate.
05. Sliding lock.
06. First direction.
07. Second direction.
08. Fixing plate.
09. Fixing means.

DESCRIPTION OF THE DRAWINGS

A number of embodiments of the invention will be explained in more detail in the following with reference to the drawings.

Figure 1:
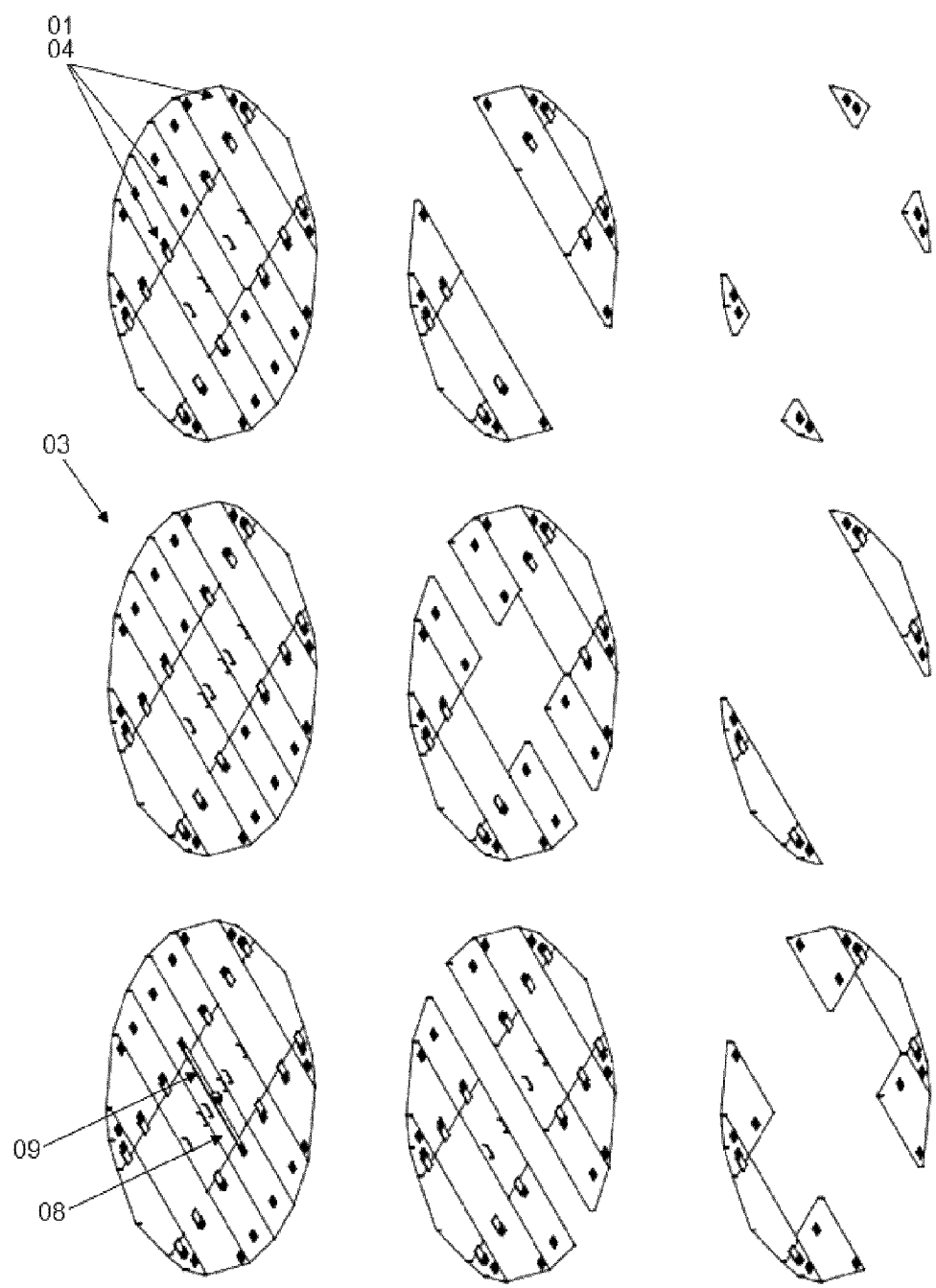
FIG. 1 shows an overview of a group of plate elements and order of installation in a reactor (not shown) according to an embodiment the invention.

In FIG. 1 the sequence of the assembly of plate elements 01 in a reactor (not shown) according to an embodiment is shown. In this case four separate plate elements which are sliding lock plates 04 are positioned in four separate positions of one level of the reactor. First they are positioned vertically downwards in the reactor i.e. in a first direction 06, and then they are horizontally slid into their final mounted position, i.e. they are slid in a second direction 07, which in this case is perpendicular to the first direction.

Figure 2:
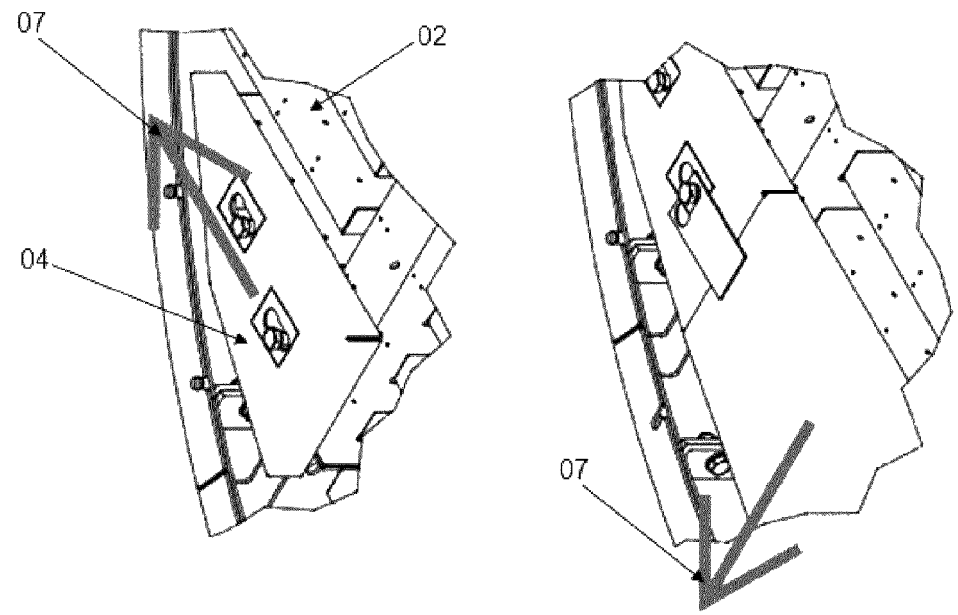
FIG. 2 shows a detailed view of the assembling of plate elements in a reactor according to an embodiment of the invention.
Figure 2:
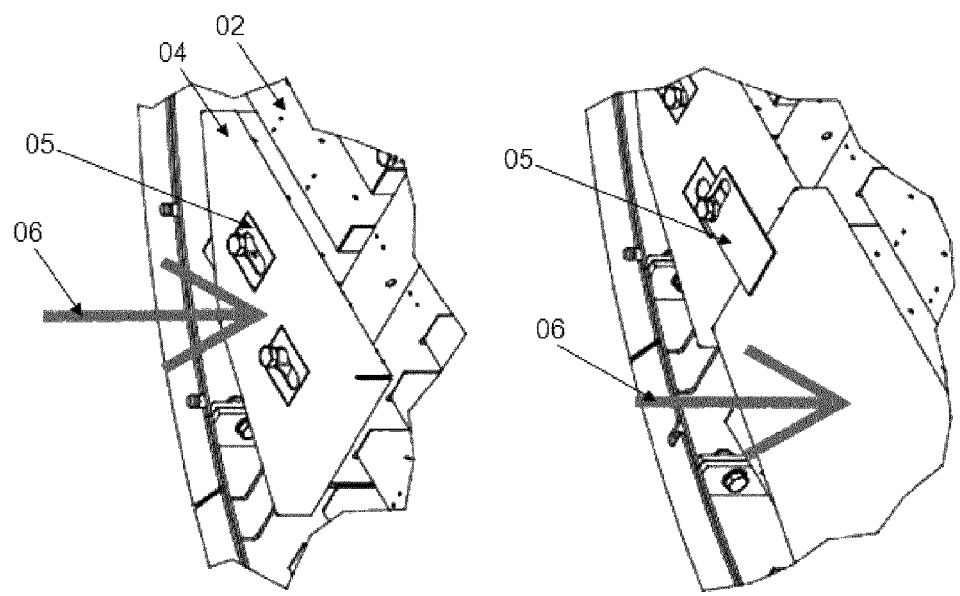

This is seen in more detail on the first and second picture in FIG. 2, where one of the four plate elements is shown. The arrow downwards indicates how the plate element is mounted in the first direction. The plate element has two sliding lock elements 05, key-hole elements. The downwards positioning of the plate element on the underneath base elements 02 is possible because the large part of the key-hole enables the passing of the bolt-head which is fixed to the base elements underneath. On the second picture of FIG. 2, the arrow indicates how the plate element is slid horizontally in a second direction into its final mounted position. In this position it is obvious from the picture that the bolt heads of the two sliding locks cannot pass the key-holes because the bolt heads are now adjacent to the small part of the key-holes which cross sectional areas are smaller than the bolt head. Hence, in this position, the sliding locks prevent the plate elements from moving against the first direction, they are locked against movement in an axis parallel to the first direction.

The plate elements can however still slide back against the second direction. To prevent this without the use of elaborate and possibly tool-demanding fixing elements, a consecutive plate element is mounted just next to the first plate element to block and prevent the preceding plate element from sliding moving against the second direction. Actually in the embodiment of the invention shown in FIG. 1, the consecutive plate element serves as block for two preceding plate elements; hence it prevents two consecutive sliding lock plates from moving against each of their second directions. As seen on FIG. 2, the last two pictures, the consecutive plate element may also be a sliding lock plate. The arrows indicate how also the consecutive plate element is first positioned on the base elements in a first direction and then slid into its final mounted position in a second sliding direction. As clearly seen on FIG. 1 and in more detail also on FIG. 2, the consecutive plate element comprises at least one sliding lock (from FIG. 1 two sliding locks are visible), more specifically a keyhole element. In this particular embodiment, the keyhole fits over the bolt element which also is used to fix the preceding plate element, thus saving material cost and lowering the complexity.

As seen on FIG. 1, a group of plate elements 03 may form a whole level of plate elements, and can be assembled in the above described way in a reactor. The number of plate elements can vary from only one or two plate elements up to a large number depending of the application, purpose and the size of the reactor.

Figure 3:
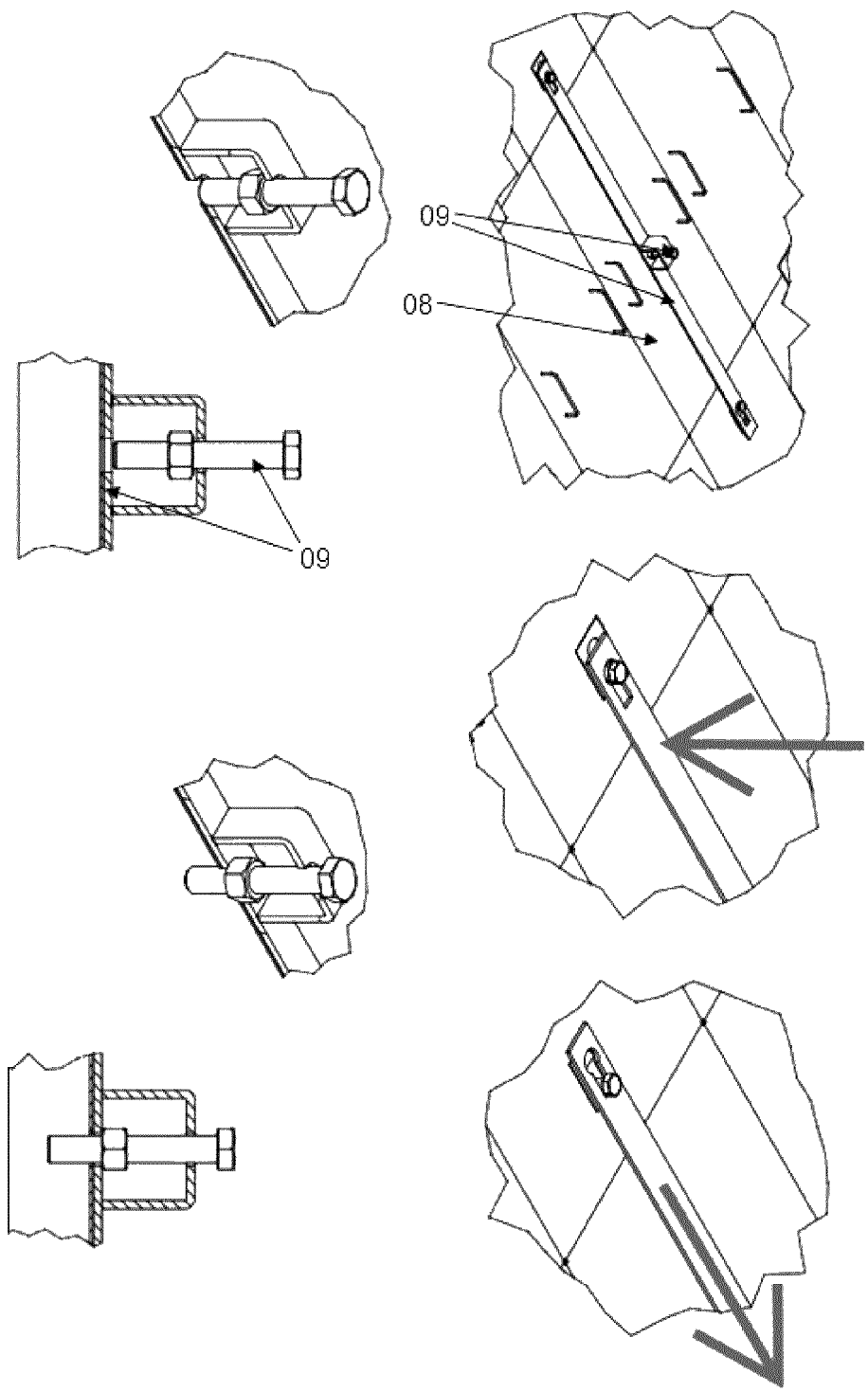
FIG. 3 shows a further detailed view of the assembling of plate elements in a reactor according to an embodiment of the invention.

On FIG. 3 an embodiment of the invention is shown, where one of the plate elements in a plate element group is a fixing plate 08 which has at least one fixing means 09. This fixing plate is mounted as the last plate in the consecutive mounting order of a plate element group. It is mounted in a first direction (downwards) where it blocks the preceding plate element or more preceding plate elements from sliding. In this position it may or may not be able to slide. In any case, since it is the last plate element to be mounted, it cannot be locked or blocked by a consecutive plate element. Therefore to fix this last plate element, at least one fixing means is necessary. In the embodiment shown in FIG. 3, the fixing means comprises a sliding bar, with keyhole elements in both ends, and a central screw fix with a counter nut for locking the screw. This screw prevents the sliding bar from sliding when mounted.

Thus, as understood from the drawings and their description above, a whole level of plate elements in a reactor, comprising a large number of plate elements (in this embodiment 19 plate elements) can be mounted and fixed (and de-mounted) quickly and simple with no use of tools, except for the use of tools for the fixing element for the last of the consecutive plate elements. In a further embodiment (not shown) even tools for the last fixing element may be omitted, if another fixing element such as a hand operated wing nut, an eccentric with a lever, a knee-joint or the like quick release elements are used as fixing elements.

EXAMPLE

The invention may be used to construct an impingement plate located above the distribution zone in a hydroprocessing reactor. In this particular example, elements have various shapes. Some are rectangular, others triangular and some may have a bent side. The rail system of the impingement plate in this example resembles a keyhole and a bolted screw.

1. The first element of the impingement plate is slid into its position. In this particular example, the tray below the impingement plate has a bolted screw on it and the first element has a keyhole (rail). The element is slid in its position by sliding the keyhole on the bolted screw. At this stage, the first element is loosely fixed in one point to the below tray. The first element has now two degrees of freedom in the movement. Rotational, around the bolted screw, and translational, in the direction of the rail. The bolt prevents axial movement, perpendicular to the plane of the tray. Both degrees of freedom may be constrained. In this particular example, the rotational movement may be partially sterically hindered by the shape of the element vs. other elements of construction. The translational movement constrained by the length of the rail.

2. The second element is slid in its position. In this particular case, the sliding direction of the second element is perpendicular to the sliding direction of the first element. Once the second element is in its position, one side of the second element is adjacent to the one side of the first element that is perpendicular to the sliding direction of the first element. Thus, positioning of the second element sterically hinders any translation of the first element. In this particular case, since the two elements are adjacent by a side, also the rotational movement of the first element is constrained. Thus, once the second element is in its position, the first element has no more degrees of freedom. The second element has one degree of freedom; translational, in the direction of the slide and constrained by the length of the rail. The movement in the axial direction perpendicular to the plane of the tray is blocked by the bolt as soon as the element is placed in its position.

3. The third element and all subsequent elements, except the last one are slid in their position as described for the second element. They all constrain the movement of the foregoing plate in the sliding direction.

4. The last element is placed in its position. Positioning the last elements constrains the movement of the second last element in the sliding direction of the second last element.

5. The last element is locked to its position by a method known in the art. Locking of the last element implies locking of all the structure, which is now fixed with no degrees of freedom.

The invention claimed is:

1. Reactor for chemical reactions comprising a plate fixing system comprising one or more loose plate elements and one or more base elements fixed to the reactor, said plate elements are positioned in at least one group of plate elements on at least one group of base elements, at least one plate in each group are sliding lock plates, each comprising at least one sliding lock enabling positioning of said sliding lock plate on said base elements in a first direction and thereafter sliding said sliding lock plate in a second direction relative to said base elements to a position where it is locked against movement against the first direction, the sliding lock plates are positioned in a consecutive order where a consecutive sliding lock plate is adapted to be positioned adjacent to a preceding sliding lock plate and with a sliding direction different from the sliding direction of the preceding sliding lock plate, whereby said consecutive sliding lock plate blocks the preceding sliding lock plate against sliding movement.

2. Reactor according to claim 1, wherein the plate elements of each group are located in one level, thereby forming an assembled plate.

3. Reactor according to claim 1, wherein the first direction is coaxial with the reactor and the second direction is perpendicular to the reactor axis.

4. Reactor according to claim 1, wherein the sliding direction of any of the consecutive sliding lock plates is perpendicular to the sliding direction of its preceding sliding lock plate.

5. Reactor according to claim 1, wherein all plate elements in a plate element group except one are sliding lock plates, and one plate element is a fixing plate which has at least one fixing means, the fixing plate is adapted to be positioned adjacent to and in a consecutive order after the last of the consecutive order sliding lock plates, the fixing means is adapted to fixing the fixing plate to the base elements in a position where it blocks the sliding movement of said last of the consecutive order sliding lock plates.

6. Reactor according to claim 1, wherein the plate elements are elements of a reactor tray.

7. Reactor according to claim 1, wherein the base elements comprise rails.

8. Reactor according to claim 1, wherein the sliding lock is of the keyhole and bolt type, with either the bolt part fixed to the base elements and the keyhole part fixed to the sliding lock plates, or the keyhole part fixed to the base elements and the bolt part fixed to the sliding lock plates, or a mix of both.

9. Reactor according to claim 5, wherein the fixing means is a quick release element.

10. Reactor according to claim 5, wherein the fixing means is a screw and nut element, a screw and wing nut element, a knee joint element or a wedge element or any of the mentioned elements in combination with a keyhole and bolt element.

* * * * *